(No Model.)
W. H. MILEY.
LET-OFF FOR LOOMS.
No. 475,590. Patented May 24, 1892.
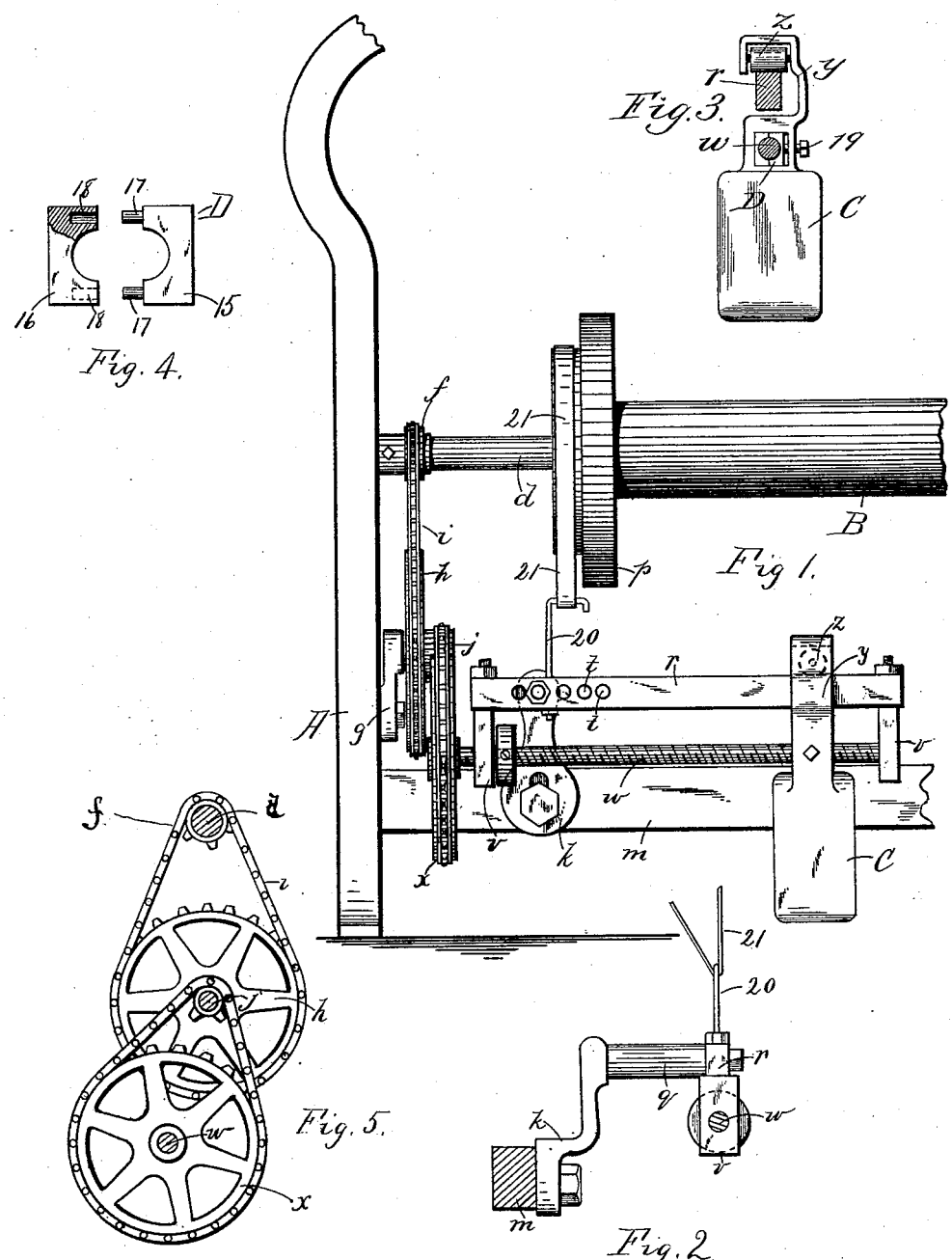
WITNESSES
Irving H. Fay.
H. Durfee
INVENTOR
William H. Miley,
By C. A. Shawtlee,
ATTYs

United States Patent Office.

WILLIAM H. MILEY, OF FALL RIVER, MASSACHUSETTS.

LET-OFF FOR LOOMS.

SPECIFICATION forming part of Letters Patent No. 475,590, dated May 24, 1892.

Application filed July 6, 1891. Serial No. 398,569. (No model.)

*To all whom it may concern:*

Be it known that I, WILLIAM H. MILEY, of Fall River, in the county of Bristol, State of Massachusetts, have invented certain new and useful Improvements in Let-Offs for Looms, of which the following is a description sufficiently full, clear, and exact to enable any person skilled in the art or science to which said invention appertains to make and use the same, reference being had to the accompanying drawings, forming part of this specification, in which—

Figure 1 is an elevation showing a portion of a loom-frame and beam with my improved let-off mechanism in position; Fig. 2, a side elevation of the supporting bracket; Fig. 3, a like view of the traveling weight; Fig. 4, an elevation of the separable nut, and Fig. 5 an elevation illustrating certain details of construction.

Like letters and figures of reference indicate corresponding parts in the different figures of the drawings.

My invention relates especially to an automatic let-off mechanism which is actuated directly from the beam; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation:

In the drawings, A represents the loom-frame, and B the beam, which may be of any ordinary form and construction. On the journal $d$ of the beam a small sprocket-wheel $f$ is mounted. A bracket $g$ on one of the frame-standards bears a large sprocket-wheel $h$, connected by a jack-chain $i$ with the sprocket $f$. On the hub of the sprocket $h$ a small sprocket $j$ is mounted. A vertical adjustable bracket $k$ is mounted on the brace $m$ of the frame directly under the pulley $p$ of the beam. By making the bracket vertically adjustable the lever $r$ can be so adjusted as to produce the proper tension upon the friction-plate 21 and the drive-chain, gearing together the wheels $x$ and $h$. Said bracket is provided in its upper end with an outwardly-projecting horizontal arm $q$, upon which a lever $r$ is pivoted. Said lever is provided with a longitudinally-arranged series of holes $t$, whereby its fulcrum may be adjusted. From each end of the lever an arm $v$ is pendent, and in said arms a horizontally-arranged endless screw or worm $w$ is fitted to rotate. One end of the worm bears a sprocket $x$, which is connected by a jack-chain with the sprocket $j$. A weight C is fitted to travel on the worm $w$. Said weight is provided with a hook-shaped arm $y$ at its top, in which a friction-roll $z$ is journaled, said roll bearing upon the upper edge of the lever $r$. The worm passes centrally through the lower portion of the arm $y$, as best shown in Fig. 3, and a separable nut D, (shown in Fig. 4,) disposed in said arm, travels on said worm. Said nut comprises two members 15 and 16, the member 15 being provided with pins 17, adapted to enter suitable openings 18 in the companion member 16. A set-screw passing through the weight-arm $y$ (see Fig. 3) forces said nut members into engagement with said worm. Near the fulcrum of the lever $r$ a vertically-arranged hook 20 is secured, and on the hub of the beam-pulley $p$ a friction-plate 21 is disposed, said plate passing around said hook.

In the use of my improvement the weight C, being disposed at or near the outer end of the long arm of the lever $r$, and the beam being in motion, said beam drives the worm $w$ by means of the sprockets, causing the nut D on the weight C to travel on said worm toward the inner end of the lever $r$, gradually decreasing the tension of the hook 20 on the friction-plate 21 and quickening the beam. As the speed thereof increases, the rotation of the worm increases proportionately, regulating automatically the friction of said belt and thereby the speed of the beam. When the weight has reached the inner end of the lever-arm $r$ to return the same, the set-screw 19 is turned outward, freeing the separable nut D, the members of which may be parted until out of contact with the worm-thread, and said weight may then be readily run back away from the lever-fulcrum.

Having thus explained my invention, what I claim is—

1. In a let-off mechanism for looms, the combination of the frame, a vertically-adjustable bracket secured thereto, a warp-beam, a horizontally-adjustable lever pivoted to said bracket, a worm mounted in bearings on said lever, a friction-belt on the warp-beam, connected to a hook connected to one arm of said lever, a balance-weight provided with a hooked arm, carrying a roller adapted to travel on the balance-lever, said arm engaging the worm and being operated thereby, sprocket-wheels on the warp-beam, and one end of the worm and a double sprocket-wheel mounted on the frame intermediate said sprocket-wheels, and drive-chains passing over said sprocket-wheels, whereby the worm is driven by the beam, substantially as described.

2. In a let-off mechanism, the combination of the loom-frame, a bracket secured thereto, a warp-beam, a balance-lever adjustably pivoted to said bracket, a worm mounted in bearings on said lever, a friction-belt connecting one arm of said lever with the warp-beam, a balance-weight provided with a perforated hook-shaped arm engaging the lever, a separable nut fitted within the perforated portion of the hook-shaped arm and engaging the worm, and gearing connected with the worm and warp-beam for driving the worm, substantially as described.

3. The loom-frame, in combination with the balance-lever, worm and actuating mechanism, the weight C, provided with the roll $z$, working on said lever, and the separable nut D, secured in said weight and working on said worm.

4. In a let-off mechanism for looms, the combination of the loom-frame, a bracket secured thereto, a warp-beam, a balance-lever adjustably pivoted to said bracket, a worm mounted in bearings on said lever, a friction-belt connecting one arm of said lever with the warp-beam, a balance-weight provided with a perforated hook-shaped arm engaging the lever, a separable nut fitted within the perforated portion of the hook-shaped arm and engaging the worm, a set-screw for adjusting the nut, and gearing connected with the worm and warp-beam for driving the worm, substantially as described.

WILLIAM H. MILEY.

Witnesses:
THOMAS CONNELLY,
GEORGE E. BAMFORD.